US011269747B2

(12) United States Patent
Chu et al.

(10) Patent No.: US 11,269,747 B2
(45) Date of Patent: Mar. 8, 2022

(54) METHOD, SYSTEM AND APPARATUS FOR ASSESSING APPLICATION IMPACT ON MEMORY DEVICES

(71) Applicant: SYMBOL TECHNOLOGIES, LLC, Lincolnshire, IL (US)

(72) Inventors: Shan Chu, St. James, NY (US); Chikwan Cheung, Jericho, NY (US); Zi Peng Xie, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 334 days.

(21) Appl. No.: 15/915,988

(22) Filed: Mar. 8, 2018

(65) Prior Publication Data

US 2019/0278679 A1    Sep. 12, 2019

(51) Int. Cl.
*G06F 11/263* (2006.01)
*G06F 11/30* (2006.01)
*G06F 11/34* (2006.01)

(52) U.S. Cl.
CPC ...... *G06F 11/2635* (2013.01); *G06F 11/3037* (2013.01); *G06F 11/3409* (2013.01)

(58) Field of Classification Search
None
See application file for complete search history.

(56) References Cited

U.S. PATENT DOCUMENTS

| 8,996,951 | B2* | 3/2015 | Hyde | G06F 11/0703 |
| | | | | 711/103 |
| 9,070,481 | B1* | 6/2015 | Ellis | G11C 29/50008 |
| 9,348,761 | B1 | 5/2016 | Cummins et al. | |
| 9,811,415 | B2 | 11/2017 | Chu et al. | |
| 2005/0210161 | A1* | 9/2005 | Guignard | G06F 11/008 |
| | | | | 710/15 |
| 2006/0064687 | A1* | 3/2006 | Dostert | G06F 11/3409 |
| | | | | 718/1 |
| 2009/0132778 | A1* | 5/2009 | Danilak | G06F 11/008 |
| | | | | 711/167 |
| 2010/0325340 | A1 | 12/2010 | Feldman et al. | |
| 2011/0035535 | A1* | 2/2011 | Locasio | G11C 16/349 |
| | | | | 711/103 |

(Continued)

OTHER PUBLICATIONS

International Search Report and Written Opinion for International Application No. PCT/US2018/065795 dated Feb. 28, 2019.

*Primary Examiner* — Lina M Cordero

(57) ABSTRACT

A method of assessing impact of applications executed by a computing device on a memory of the computing device includes: storing, in the memory, (i) a plurality of reference write operation sizes, and (ii) for each reference write operation size, a corresponding reference endurance indicator defining a write endurance; executing, at a processor of the computing device interconnected with the memory, a monitor application simultaneously with a test application; via execution of the monitor application at the processor: generating a usage profile for the test application, the usage profile defining a measured write operation size and a measured write operation rate for write operations initiated by the test application; determining an impact indicator for the test application based on the usage profile, the reference write operation sizes and the reference endurance indicators; and presenting the impact indicator.

18 Claims, 6 Drawing Sheets

(56) References Cited

U.S. PATENT DOCUMENTS

| | | | |
|---|---|---|---|
| 2012/0124273 A1* | 5/2012 | Goss | G11C 16/349 |
| | | | 711/103 |
| 2014/0172325 A1* | 6/2014 | Naji | G06F 11/008 |
| | | | 702/34 |
| 2014/0181363 A1 | 6/2014 | Hoang et al. | |
| 2014/0365449 A1* | 12/2014 | Chambliss | G06F 16/1752 |
| | | | 707/692 |
| 2014/0372681 A1* | 12/2014 | Cha | G06F 3/0616 |
| | | | 711/103 |
| 2015/0331775 A1* | 11/2015 | Slik | G06F 11/1451 |
| | | | 714/6.23 |
| 2016/0203416 A1* | 7/2016 | Kvernvik | G06F 11/3452 |
| | | | 706/12 |
| 2016/0342345 A1* | 11/2016 | Kankani | G06F 3/0616 |
| 2017/0199681 A1* | 7/2017 | Jain | G06F 3/0638 |
| 2017/0199769 A1* | 7/2017 | Jain | G06F 9/5077 |
| 2017/0199798 A1* | 7/2017 | Jain | G06F 11/3024 |
| 2017/0228161 A1* | 8/2017 | Nangoh | G06F 3/0604 |

\* cited by examiner

METHOD, SYSTEM AND APPARATUS FOR ASSESSING APPLICATION IMPACT ON MEMORY DEVICES

BACKGROUND

Computing devices, such as portable (e.g. handheld) mobile computing devices, frequently include storage assemblies in the form of one or more flash memory devices. Various factors affect the operational lifetime of such flash memory devices. These factors include environmental factors such as temperature, and also include usage-related factors such as one or both of the frequency and volume of memory access operations imposed on the flash memory devices by the various applications executed by the computing device.

Under certain conditions, the flash memory of a computing device may fail prematurely as a result of one or more of the above-mentioned factors. That is, the flash memory may cease to operate before the remainder of the computing device has reached end-of-life. Premature failure of flash memory in computing devices requires time-consuming and costly repairs to the devices, or complete replacement of the devices despite the remaining device components having not yet reached end-of-life.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
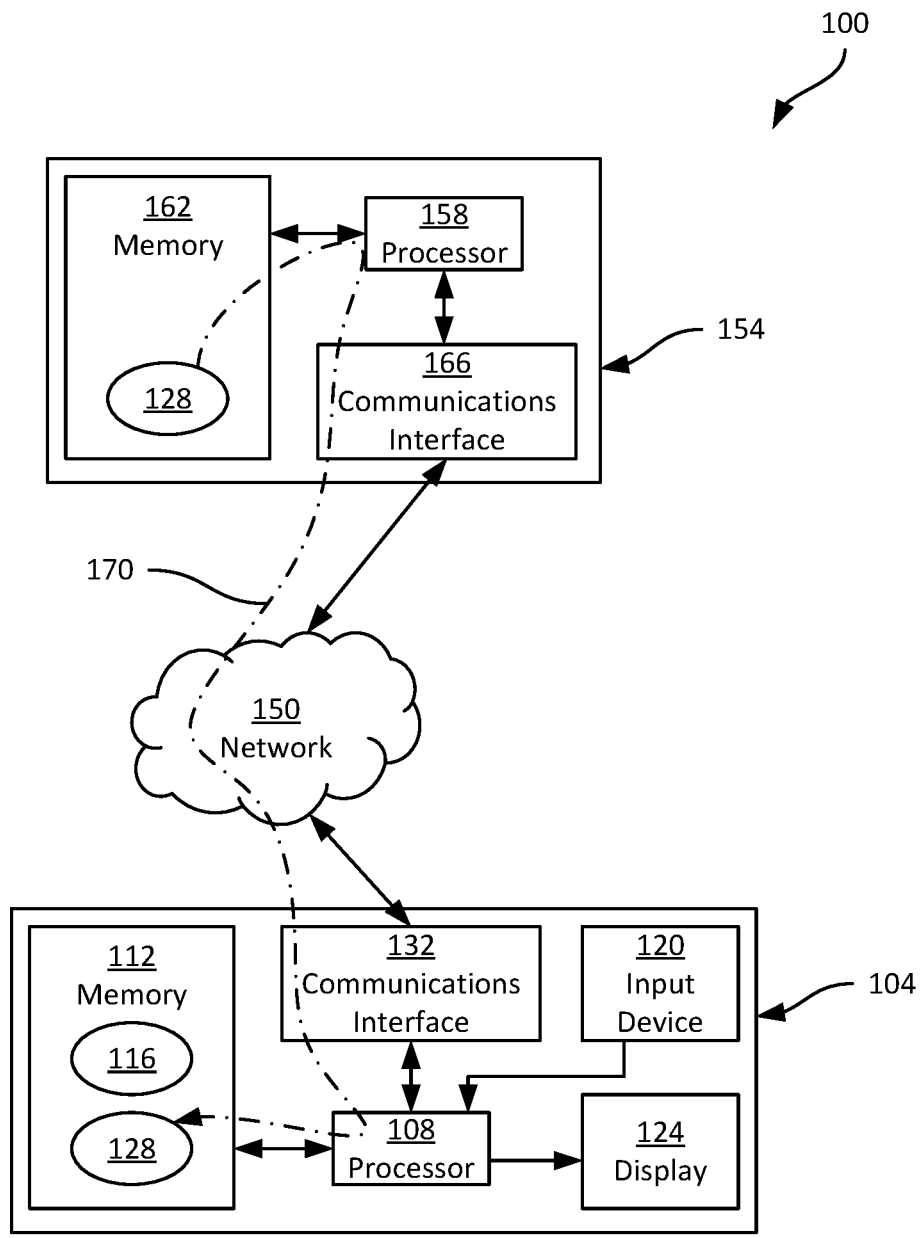
FIG. 1 depicts a system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of assessing impact of applications executed by a computing device on a memory of the computing device, comprising: storing, in the memory, (i) a plurality of reference write operation sizes, and (ii) for each reference write operation size, a corresponding reference endurance indicator defining a write endurance; executing, at a processor of the computing device interconnected with the memory, a monitor application simultaneously with a test application; via execution of the monitor application at the processor: generating a usage profile for the test application, the usage profile defining a measured write operation size and a measured write operation rate for write operations initiated by the test application; determining an impact indicator for the test application based on the usage profile, the reference write operation sizes and the reference endurance indicators; and presenting the impact indicator.

Additional examples disclosed herein are directed to a computing device, comprising: a memory storing (i) a plurality of reference write operation sizes, and (ii) for each reference write operation size, a corresponding reference endurance indicator defining a write endurance; a processor interconnected with the memory, the processor configured to execute a monitor application simultaneously with a test application; a profile generator configured to generate a usage profile for the test application, the usage profile defining a measured write operation size and a measured write operation rate for write operations initiated by the test application; an impact generator configured to determine an impact indicator for the test application based on the usage profile, the reference write operation sizes and the reference endurance indicators; the processor further configured present the impact indicator.

FIG. 1 depicts a system 100 including a computing device 104, also referred to herein simply as the device 104. The computing device 104, in the present example, is a handheld computing device such as a barcode scanner, smartphone, tablet computer, label printer, or the like. In other examples, however, the computing device 104 need not be handheld. For example, the computing device 104 can be a portable computing device such as a laptop computer, or a stationary device such as a desktop computer or the like.

The device 104 includes a central processing unit (CPU), also referred to as a processor 108, interconnected with a non-transitory computer readable storage medium in the form of a memory 112. The memory 112 includes a solid-state non-volatile memory device, such as a flash memory device. Specifically, the memory 112 can include an embedded Multi-Media Controller (eMMC) device containing one or more flash memory circuits and an associated microcontroller. The device 104 can also include other memory devices, such as a volatile memory (e.g. Random Access Memory (RAM)), not shown in FIG. 1. The processor 108 and the memory 112 each comprise one or more integrated circuits (ICs).

The memory 112 of the device 104 stores a plurality of applications, each including a plurality of computer readable instructions executable by the processor 108. The execution of the above-mentioned instructions by the processor 108 causes the device 104 to implement various functionality, as discussed herein. The applications are therefore said to be configured to perform that functionality in the discussion below. In the present example, the memory 112 stores a test application 116. The test application 116 may be an application under development (i.e. being tested on the device 104), although the test application 116 need not be limited to applications under development. The functionality implemented by the test application 116 can be, for example, to control an input device 120 of the device 104 (e.g. a camera, barcode scanner, or the like) to capture and decode indicia such as barcodes and to store the decoded data in the memory 112 as well as present the decoded data via an output device such as a display 124.

Various other functions in addition to, or instead of, barcode scanning can be implemented by the application 116. In general, the processor 108, via execution of the test application 116, is configured to access the memory 112 to write data to, or read data from, the memory 112.

The memory 112 also stores a monitor application 128 configured, as will be discussed in greater detail below, for simultaneous execution by the processor 108 with the test application 116. The monitor application 128 configures the device 104 to monitor the above-mentioned memory accesses performed as a result of execution of the test application 116. The monitor application 128 further configures the device 104 to generate an impact indicator for the test application 116, indicating a predicted impact of execution of the test application 116 on the memory 112.

The device 104 can also include additional input devices (not shown) such as any one or more of a touch screen, a keypad, a keyboard, a trigger or other actuator (e.g. the initiate a barcode scanning operation), a microphone and the like, as well as additional output devices (not shown), such as a speaker.

The device 104 also includes a communications interface 132, enabling the device 104 to exchange data with other computing devices. For example, the system 100 as illustrated in FIG. 1 includes a network 150 connecting the device 104 with a server 154. The network 150 can be a wide-area network (WAN), for example including the Internet, a local-area network (LAN) or a combination thereof. The communications interface 132 therefore includes any suitable hardware (e.g. transmitters, receivers, network interface controllers and the like) allowing the device 104 to communicate, e.g. over the network 150.

The server 154 includes a CPU, also referred to as a processor 158, interconnected with a non-transitory computer readable storage medium, such as a memory 162. The memory 162 includes any suitable combination of volatile (e.g. Random Access Memory (RAM)) and non-volatile (e.g. read only memory (ROM), Electrically Erasable Programmable Read Only Memory (EEPROM), flash) memory. The processor 158 and the memory 162 each comprise one or more integrated circuits (ICs). The server also includes a communications interface 166, enabling the server 154 to exchange data with the device 104.

In particular, the server 154 can be configured to store a copy of the monitor application 128 in the memory 162, and to provide (e.g. via the path 170, in response to a request from the device 104) the monitor application 128 to the device 104 for storage in the memory 112 and execution by the processor 108. For example, the monitor application 128 can be stored at the server 154 in the form of an Android™ Package Kit (APK) for deployment and installation to the device 104 (which may, in turn, execute the Android™ operating system).

Figure 2:
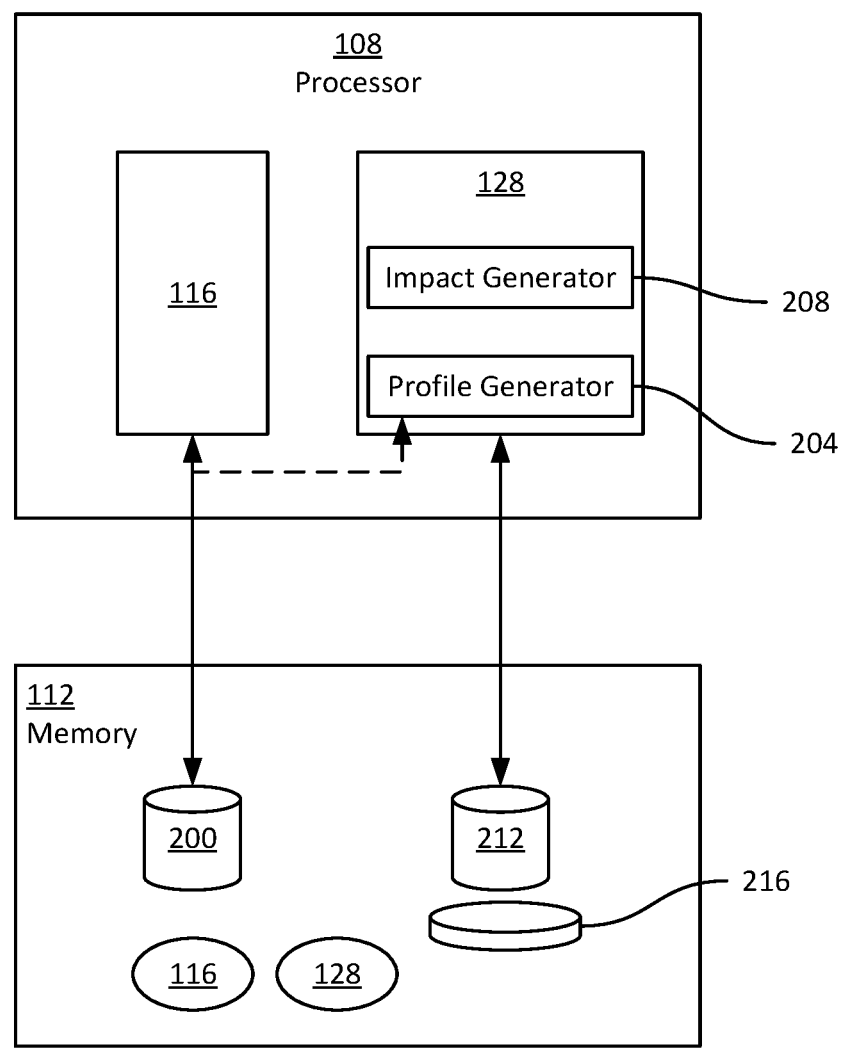
FIG. 2 depicts certain internal components of the computing device of the system of FIG. 1.

As noted above, the monitor application 128 is configured for simultaneous execution with the test application 116 at the device 104, to monitor memory accesses by the test application 116 and to assess the impact of the test application 116 on the memory 112. Turning now to FIG. 2, certain internal components of the monitor application 128 are illustrated. In other examples, the components of the monitor application 128 may be implemented as a plurality of distinct applications executed by the processor 108. In further examples, one or more of the components of the monitor application 128 shown in FIG. 2 can be implemented as specifically configured hardware elements, rather than as computer-readable instructions for execution by the processor 108. For example, one or more of the components of the monitor application 128 shown in FIG. 2 can be implemented as a field-programmable gate array (FPGA), an application-specific integrated circuits (ASIC), or the like.

As illustrated in FIG. 2, the monitor application 128 is executed by loading an instance of all or some of the instructions comprising the monitor application 128 from the memory 112 into the processor 108 (e.g. for storage in a cache memory of the also shown as having been loaded into the processor 108 for simultaneous execution with the monitor application 128.

The test application 116, during execution by the processor 108, configures the processor 108 to access the memory 112, for example to store data decoded from barcodes captured by the input device 120 in a repository 200 in the memory 112. The monitor application 128 includes a profile generator 204, configured to monitor memory accesses initiated by the test application 116. The profile generator 204 is further configured, as will be discussed below in greater detail, to generate a usage profile for the test application 116 based on the results of the above-mentioned monitoring. The usage profile is stored in the memory 112, for example in a repository 212 associated with the monitor application 128.

The monitor application 128 also includes an impact generator 208 configured, based on both the usage profile mentioned above and a set of reference data 216, to generate an indication of the impact on the memory 112 of the execution of the test application 116. That is, the impact generator 208 is configured to determine the effect of execution of the test application 116 on the lifespan of the memory 112.

Figure 3:
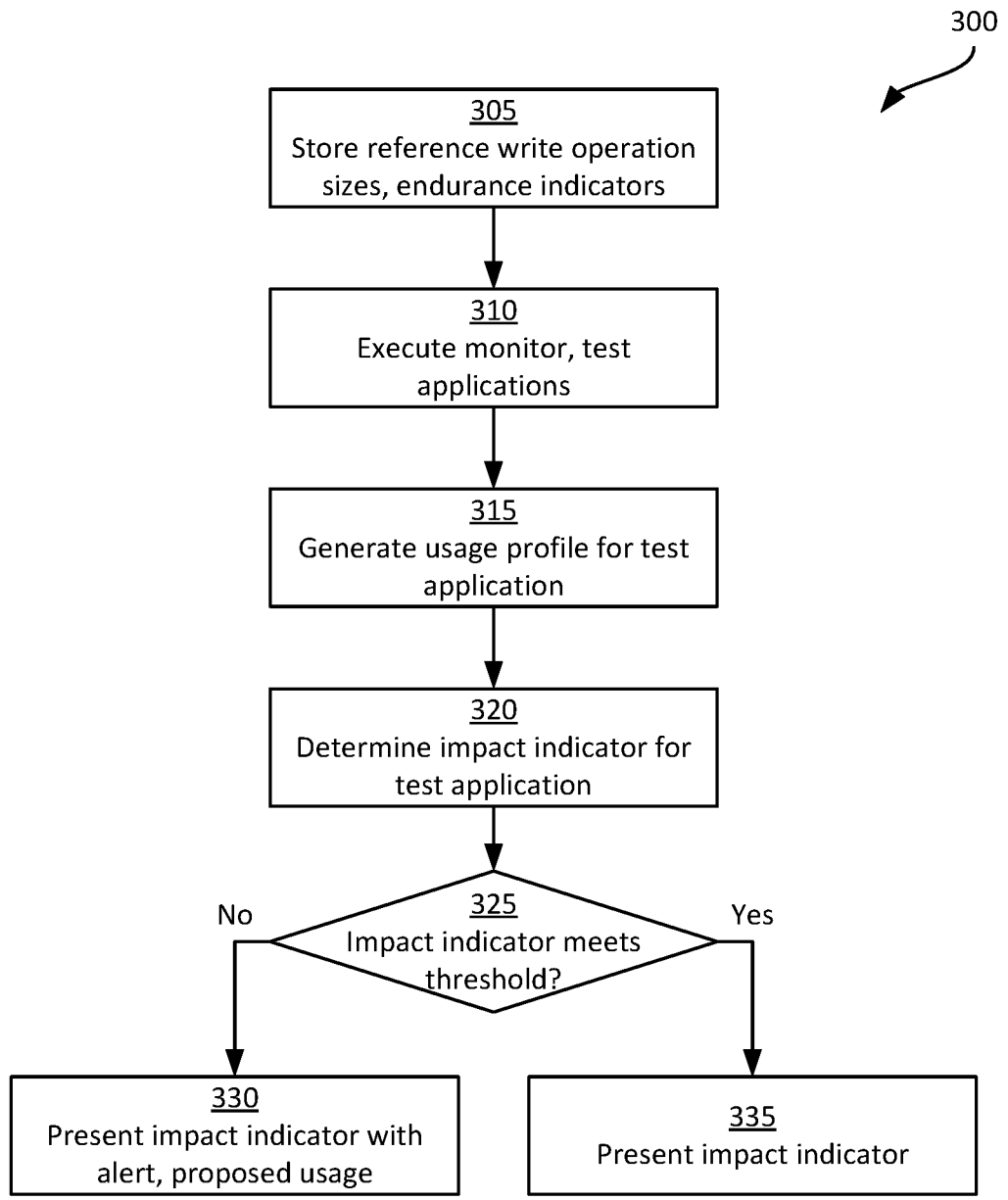
FIG. 3 is a flowchart illustrating a method of assessing the impact of applications on a memory.

Turning now to FIG. 3, a method 300 of assessing the impact of applications (e.g. the test application 116) on a memory (e.g. the memory 112) is illustrated. The method 300 will be described in conjunction with its performance on the system 100. More specifically, the method 300 as described below is performed by the device 104, with reference to the components of the device 104 and of the monitor application 128 shown in FIGS. 1 and 2.

At block 305, the device 104 is configured to store reference write operation sizes, as well as reference endurance indicators. Specifically, a reference endurance indicator is stored for each of the reference write operation sizes. The reference data stored at block 305 is collected prior to the performance of the method 300. For example, the reference data may be collected empirically, by imposing a series of write operations at each of the reference write operation sizes on one or more memory devices, and obtaining measurements of the impact on memory endurance of each of the series of write operations. Table 1, below, illustrates an example set of reference data 216 containing reference write operation sizes and reference endurance indicators.

TABLE 1

Example Reference Data 216

| Reference Write Operation Size (bytes) | Reference Endurance Indicator (no. of writes per wear metric step) |
|---|---|
| 64 | 42133 |
| 128 | 41053 |
| 256 | 40305 |
| 512 | 38393 |
| 1024 | 34782 |

TABLE 1-continued

Example Reference Data 216

| Reference Write Operation Size (bytes) | Reference Endurance Indicator (no. of writes per wear metric step) |
|---|---|
| 2048 | 30055 |
| 4096 | 22315 |
| 8192 | 19213 |
| 16384 | 14565 |
| 32768 | 9773 |
| 65536 | 5928 |

In the present example, the reference data 216 is obtained (prior to storage at block 305) by imposing a plurality of series of write operations on the memory of a plurality (e.g. three) computing devices. Each series of write operations has the same write operation size. Thus, for example, a series of 64-byte write operations is tested, followed by a series of 128-byte write operations, and so on.

As will be apparent to those skilled in the art, memory devices typically update (e.g. in the microcontroller of an eMMC device) a wear metric. For example, certain memory devices maintain an internal wear/erase metric having values from zero (indicating no wear) to 3000 (indicating memory failure or end-of-life). Other memory devices maintain an internal "DEVICE_LIFE_TIME_EST" wear metric having values between zero (indicating no wear) and ten (indicating memory failure or end-of-life). For each of the above-mentioned series of write operations, the number of such write operations to cause a predetermined increase in the wear metric is recorded. When a plurality of devices are employed to gather the reference data 216, the measurements from each device (which may not match exactly) can be averaged. Thus, as seen in Table 1, for write operations of 64 bytes, a one-step increase in the wear/erase wear metric occurs after 421,333 write operations. The number of write operations required to cause the predefined increase in the wear metric is the reference endurance indicator. In other examples, the reference data 216 need not store endurance indicators corresponding to single steps in the wear metric. Instead, for example, the reference data 216 can contain a number of write operations for a given write operation size to increase the wear metric to its maximum value (e.g. 3000 in the example above).

The reference data stored at block 305 is typically specific to a particular type of memory device. Thus, the reference data 216 shown in FIG. 2 is specific to the type of the memory 112. The monitor application 128 may contain a plurality of sets of reference data in some embodiments, each corresponding to a given type of memory device. The monitor application 128, in such embodiments, can be configured to detect the type (e.g. the model number or the like) of the memory 112, and to select a corresponding one of the sets of reference data for use during the performance of the method 300. In other embodiments, the monitor application 128 can be deployed to the device 104 (e.g. by the server 154) with only one set of reference data 216. For example, during deployment of the monitor application 128, the server 154 can be configured to prompt an operator of the device 104 for a type of the memory 112, or to otherwise detect a type of the memory 112. The server 154 can then be configured to retrieve a set of reference data specific to that type of memory device from the memory 162, for delivery to the device 104 with the monitor application 128.

At block 310, the device 104 is configured to execute the test application 116 and the monitor application 128 simultaneously. For example, the device 104 can be configured to initiate each of the applications 116 and 128 in response to input commands to begin execution of the applications 116 and 128. In other examples, the device 104 can be configured to initiate execution the monitor application 128 automatically in response to initiation of the test application 116.

At block 315, the device 104 is configured, via the execution of the monitor application 128, to generate a usage profile for the test application 116. In general, the usage profile defines a measured write operation size, and a measured write operation rate for write operations initiated by the test application 116. The monitor application 128, and specifically the profile generator 204, is configured to monitor the memory accesses initiated by the test application 116. For example, the profile generator 204 can be configured to store a log of all write operations initiated by the test application 116 over the course of a configurable time period (e.g. five days; time periods longer and shorter than five days may also be employed). For each record in the log, the profile generator 204 stores the size (e.g. in bytes) of the write operation.

From the above-mentioned log, the profile generator 204 is configured to generate the usage profile. The measured write operation size in the usage profile is the average write operation size as determined from the log. Thus, if every write operation initiated by the test application 216 has the same size (e.g. 128 bytes), that is the size of the measured write operation. When the write operations initiated by the test application 116 have different sizes, the profile generator 204 is configured to generate an average write operation size based on the size and number of each individual write operation. For example, if over a period of two days the profile generator 204 records two hundred thousand write operations, of which eighty thousand have a size of 64 bytes and the remainder have a size of 256 bytes, the measured write operation size is 179.2 bytes. The measured write operation rate is determined by the profile generator 204 using the total number of recorded write operations and the above-mentioned time period. Thus, in the present example, the measured write operation rate is 100,000 write operations per day. The rate may be expressed in other units (e.g. writes per hour, writes over the entirety of the monitoring time period, and the like). The resulting usage profile is shown in Table 2 below.

TABLE 2

Example Usage Profile 212

| Measured Write Operation Size (bytes) | Measured Write Operation Rate (writes per day) |
|---|---|
| 179.2 | 100000 |

At block 320, the monitor application 128, and specifically the impact generator 208, is configured to generate an impact indicator for the test application 116 based on the reference data 216 and the usage profile 212. The impact indicator, in the present example, is a predicted lifespan of the memory 112. Specifically, the impact indicator represents a predicted time period after which the wear indicator noted earlier will reach the maximum value (of 3000, in this example), following which the memory 112 is expected to cease functioning.

Figure 4:
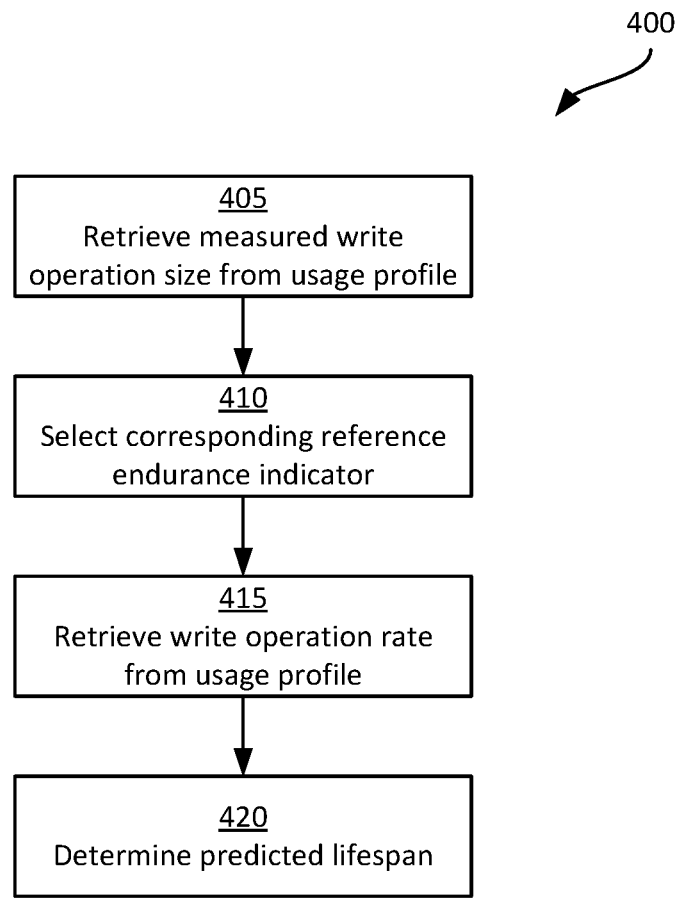
FIG. 4 is a flowchart illustrating a method of determining an impact indicator in the method of FIG. 3.

The impact generator 208 need not generate the impact indicator immediately following generation of the usage profile by the profile generator 204. For example, the monitor application 128 can be configured to initiate the performance of block 320 responsive to a command received via an input device such as a keypad, touch screen or the like. In some examples, the performance of block 320 can be implemented on a different computing device than the device 104. For example, the usage profile 212 can be transmitted to the server 154 or another suitable computing device for generation of the impact indicator. In the present example, in which the impact indicator is a predicted lifespan, the impact indicator can be generated according to a method 400, shown in FIG. 4. That is, the method 400 is an example method for performing block 320 of the method of FIG. 3.

At block 405, the impact generator 208 is configured to retrieve the measured write operation size from the usage profile 212 (i.e. 179.2 bytes in the present example). At block 410, the impact generator 208 is configured to select a corresponding reference endurance indicator based on the reference data 216. The corresponding reference endurance indicator may not be explicitly stored in the reference data 216. For example, in the present example performance of the methods 300 and 400, employing the reference data 216 shown in Table 1, no reference endurance indicator is stored for a write operation size of 179.2 bytes. The impact generator 208 is configured, therefore, to generate a reference endurance indicator, for example by interpolating between the closest available values in the reference data 216.

In the present example, therefore, a reference endurance indicator is generated at block 410 for a write operation size of 179.2 bytes based on the reference endurance indicators corresponding to write operation sizes of 128 and 256 bytes. Specifically, the reference endurance indicator generated at block 410, in the present example, is about 40,754 write operations per one-step increase in the wear metric of the memory 112.

At block 415, the impact generator 208 is configured to retrieve the write operation rate (e.g. 100,000 writes per day, as shown in Table 2) from the usage profile 212. At block 420, the impact generator 208 is configured to determine a predicted lifespan of the memory 112 using the retrieved rate from block 415 and the selected reference endurance indicator from block 410. In the present example, the impact indicator is generated by dividing the selected reference endurance indicator by the measured write operation rate. The result of the division is then multiplied by 3000, because the reference endurance indicator corresponds to one of an available 3000 steps of the wear metric. Continuing with the example data noted above, the impact indicator (i.e. the predicted lifespan in this example) generated at block 420 is about 1222 days, or about 3.3 years.

Other mechanisms for determining an impact indicator can be implemented in accordance with the nature of the reference data 216. For example, when the reference data 216 includes endurance indicators corresponding to the number of write operations required to increase the wear metric to the maximum value (e.g. 3000 in the example above) rather than to increase the wear metric by one step, the above-mentioned multiplication by the number of available steps is unnecessary. In further embodiments, the determination of an impact indicator includes the conversion of the predicted lifespan determined at block 420 to one of a set of predefined impact levels. For example, the predicted lifespan can be converted to one of a set of ten impact indicators (e.g. having values from one to ten). Each of the set of indicators can be associated with a threshold corresponding to a predicted lifespan, such that if the predicted lifespan is above a given threshold, the corresponding impact indicator is selected. For example, a threshold of 2500 days can correspond to an impact indicator of one (indicating low impact), while a threshold of 500 days can correspond to an impact indicator of ten (indicating high impact).

Returning to FIG. 3, at block 325, having determined the impact indicator, the monitor application 128 is configured to determine whether the impact indicator meets a threshold. The threshold is preconfigured (e.g. stored as a setting in the monitor application 128), and reflects a level of impact beyond which the impact of the test application 116 on the memory 112 is expected to undesirably affect the operational life of the device 104 as a whole. In the present example, in which the impact indicator is a predicted lifespan in days, the threshold is defined in days and corresponds to at least a portion of an expected lifespan of the device 104. The threshold at block 325 may be, for example, equal to the expected lifespan of the device 104. In other examples, the threshold may be a fraction (e.g. 90 percent) of the expected lifespan of the device 104.

For example, the threshold may be defined as 2000 days in the present example performance of the method 300, and the determination at block 325 is therefore negative, as the predicted lifespan of 1222 days noted above does not meet the threshold. The performance of the method 300 therefore proceeds to block 330, at which the monitor application 128 is configured to present the impact indicator, for example on the display 124. The monitor application 128 can also be configured to determine and present a proposed usage profile for the test application 116, for use in guiding alterations to the test application 116.

The proposed usage profile for the test application 116 includes a proposed write operation size and a proposed write operation rate. To reduce the impact of a revised version of the test application 116 that complies with the proposed usage profile, the proposed write operation size is greater than the measured write operation size, and the proposed write operation rate is therefore smaller than the measured write operation rate. For example, the monitor application 128 can be configured to generate the proposed write operation size by applying a predefined multiplier (e.g. a factor of two) to the measured write operation size, and applying the inverse of the predefined multiplier (e.g. a factor of one half) to the measured write operation rate. As will now be apparent, a test application complying with the above-mentioned proposed usage profile (i.e. having a write operation size of 358.4 bytes and a write operation rate of 50,000 writes per day) yields a predicted lifespan of about 2315 days.

In other embodiments, rather than employing predefined factors as noted above, the monitor application 128 is configured to determine the factors to apply to the measured usage profile based on the difference between the impact indicator and the threshold applied at block 325. For example, for a threshold of 2000 days and a predicted lifespan of 1222 days, the monitor application 128 can be configured to determine a factor of 1.64 to apply to the measured write operation size, and a factor of 0.61 (the inverse of 1.64) to apply to the measured write operation rate.

When the determination at block 325 is negative, the monitor application 128 proceeds to block 335 rather than to block 330. At block 335, the impact indicator determined at block 320 is presented, for example on the display 124. The presentation of the impact indicator at blocks 330 and 335 can be implemented by, in addition to or instead of presenting the impact indicator on the display 124, transmitting the impact indicator to the server 154, or to another suitable computing device.

Figure 5:
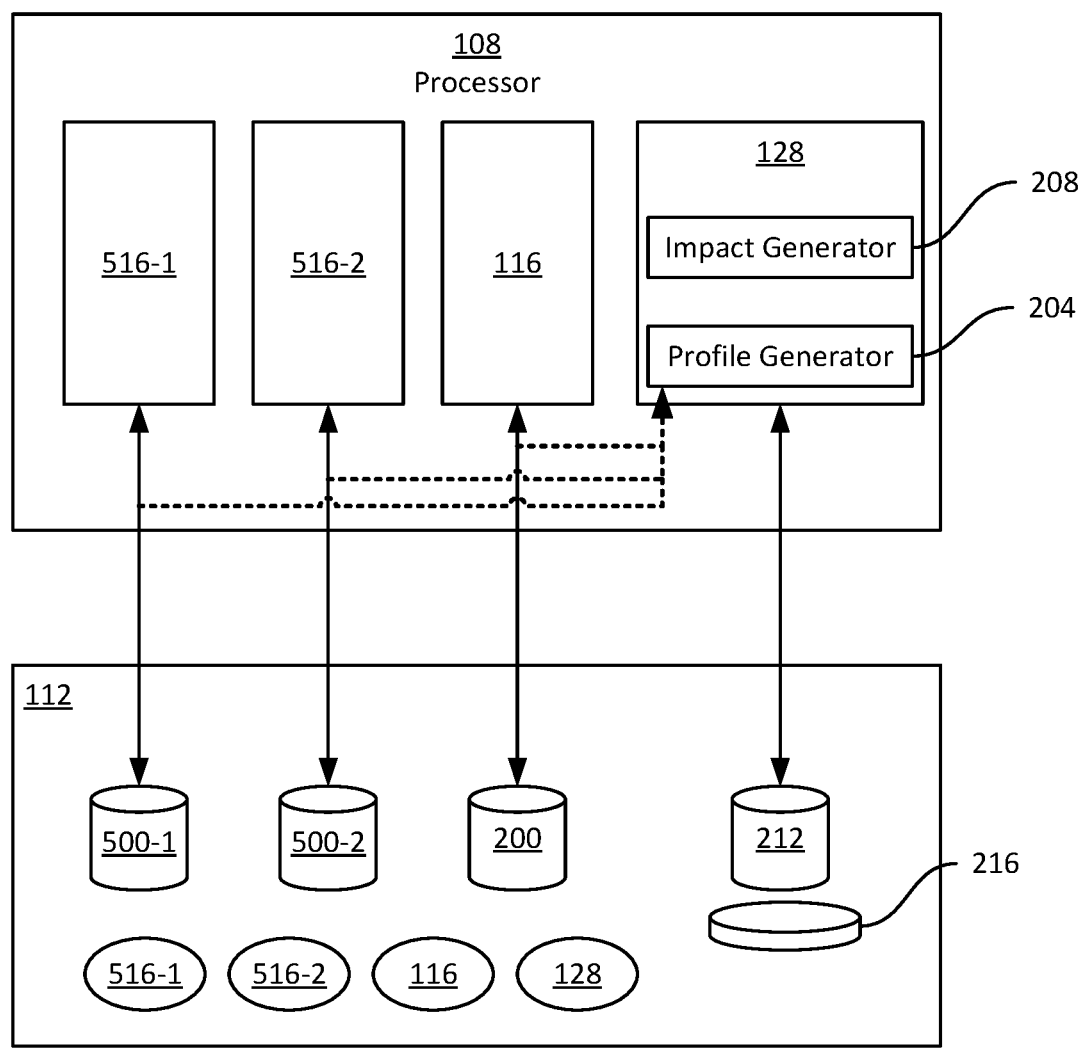
FIG. 5 depicts certain internal components of the computing device of the system of FIG. 1, according to another embodiment.

Variations to the above systems and methods are contemplated. For example, turning to FIG. 5, the monitor application 128 can be configured in other embodiments to simultaneously monitor a plurality of test applications executed by the device 104. In particular, FIG. 5 illustrates the simultaneous execution of the test application 116 as well as additional test applications 516-1 and 516-2, each of which initiate memory accesses to repositories 200, 500-1 and 500-2. The profile generator 204 is configured monitor the memory accesses initiated by each of the test applications 116 and 516.

The test applications 116 and 516 need not be executed simultaneously with one another. For example, the monitor application 128 can be configured to execute simultaneously with any one or more of the test applications 116 and 516 over a predefined period of time, whether or not all of the test applications 116 and 516 are active throughout the predefined period of time.

The monitor application 128 is configured, in such embodiments, to generate further usage profiles for each of the further test applications 516-1 and 516-2, as discussed above. The monitor application 128 is also configured to generate further impact indicators for the test applications 516-1 and 516-2. Additionally, the monitor application 128 can be configured to generate a collected usage profile and determine a collected impact indicator, based on the measured memory usage of all the test applications 116, 516 together. In such embodiments, at blocks 330 and 335 the collected impact indicator and the individual impact indicators are presented. In further examples, the collected usage profile is generated instead of, rather than in addition to, the test application-specific impact indicators.

In further embodiments, the reference data 216 is stored in other formats, and/or includes other values. For example, the reference data 216 can include a total written volume (e.g. in bytes) to increase a wear metric by one step, instead of or in addition to the number of write operations to increase the wear metric by one step, as in Table 1. In further embodiments, the reference data 216 includes a plurality of reference endurance indicators for each reference write operation size rather than a single reference endurance indicator for each reference write operation size. For example, the reference data 216 can include a reference endurance indicator for each specific step of the wear metric (e.g. an endurance indicator for the $1000^{th}$ step, a further endurance indicator for the $1001^{st}$ step, and so on). The reference data 216, in further examples, is stored in formats other than the tabular format shown above. For example, the reference data 216 can be stored as one or more equations defining a relationship between write operation size and endurance indicator.

Figure 6:
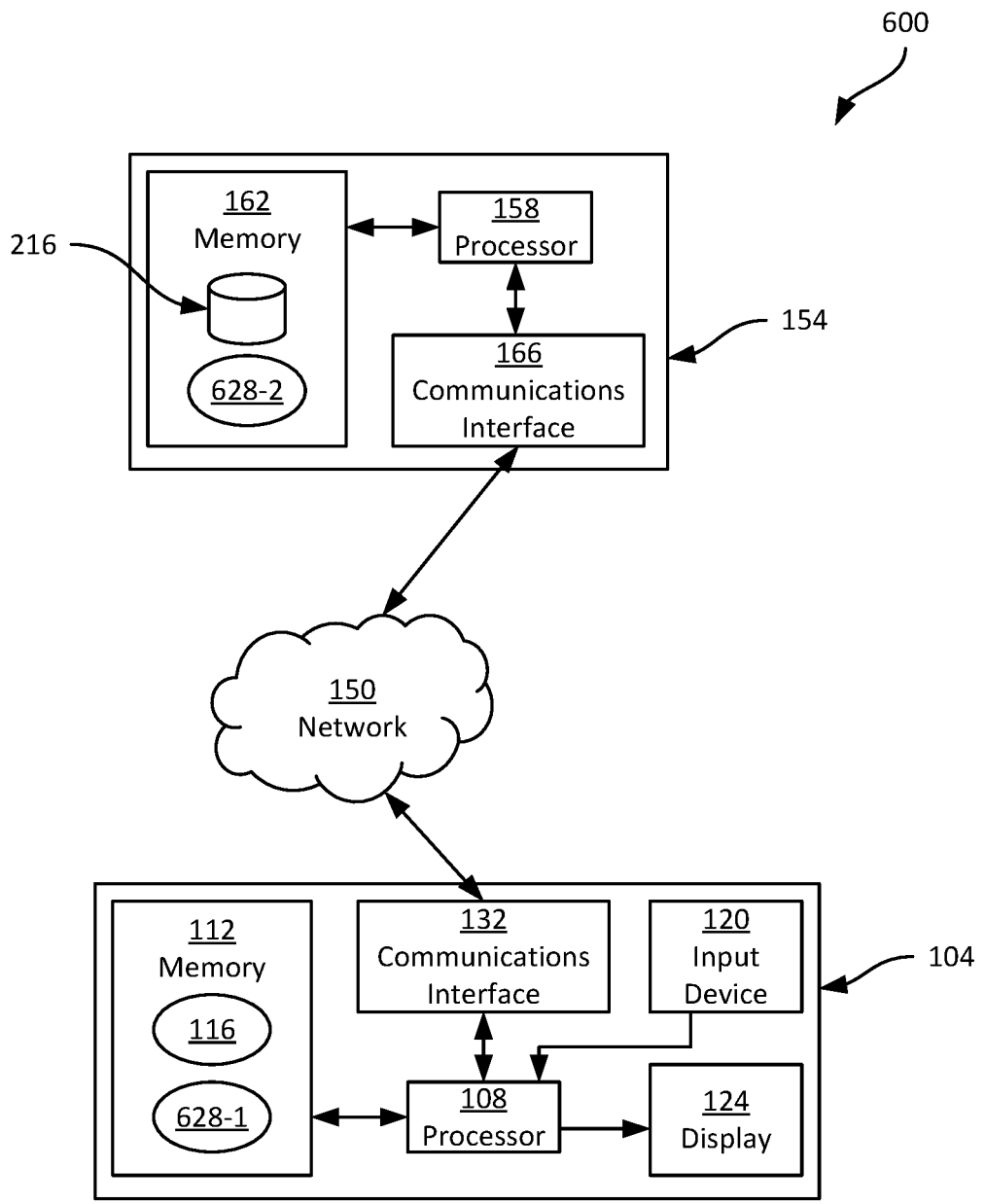
FIG. 6 depicts a system, according to another embodiment.

In further embodiments, turning to FIG. 6, a system 600 includes the components of the system 100 discussed above, but the functionality of the monitor application is divided between the device 104 and the server 154. In particular, the device 104 includes a client monitor application 628-1, while the server 154 includes a host monitor application 628-2 as well as the reference data 216. The client monitor application 628-1 is configured to perform blocks 310 and 315 of the method 300, and to then transmit the usage profile via the network 150 to the server 154. The host monitor application 628-2 is then configured to perform blocks 305 and 320-335 of the method 300 (as well as the method 400).

The resulting impact indicator can be presented via transmission by the server 154 to the device 104 or to another suitable computing device.

In still further embodiments, the device 104 is omitted, and the server 154 generates a prompt for an operator to provide input data defining a usage profile of the test application 116. Following receipt of the usage profile, the server 154 is configured to generate the impact indicator.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

The invention claimed is:

1. A method of assessing impact of applications executed by a computing device on a memory of the computing device, comprising:
storing, in the memory, (i) a plurality of reference write operation sizes, and (ii) for each reference write operation size, a corresponding reference endurance indicator defining a write endurance;
executing, at a processor of the computing device interconnected with the memory, a monitor application simultaneously with a test application;
via execution of the monitor application at the processor:
generating a usage profile for the test application, the usage profile for the test application generated via the monitor application and defining a measured write operation size and a measured write operation rate for write operations initiated by the test application;
determining an impact indicator for the test application based on the usage profile, the plurality of reference write operation sizes and the corresponding reference endurance indicators; and
presenting the impact indicator.

2. The method of claim 1, wherein the impact indicator includes a predicted lifespan of the memory.

3. The method of claim 1, wherein determining the impact indicator comprises:
retrieving a selected reference write operation size from the plurality of reference write operation sizes that matches the measured write operation size;
retrieving a selected reference endurance indicator from the corresponding reference endurance indicators that corresponds to the selected reference write operation size; and
determining the impact indicator according to the measured write operation rate and the selected reference endurance indicator.

4. The method of claim 3, further comprising:
determining, based on the measured write operation size and the measured write operation rate, a proposed usage profile for the test application defining (i) a proposed write operation size greater than the measured write operation size, and (ii) a proposed write operation rate smaller than the measured write operation rate; and
presenting the proposed usage profile.

5. The method of claim 1, further comprising:
executing the monitor application simultaneously with the test application and a further test application;
generating a further usage profile for the test application and the further test application; and
determining a further impact indicator for the further test application.

6. The method of claim 1, further comprising:
executing the monitor application simultaneously with the test application and a further test application;
wherein the usage profile defines a second measured write operation size and a second measured write operation rate for write operations initiated by the test application and the further test application.

7. The method of claim 1, further comprising:
executing the monitor application and the test application for a configurable time period; and
determining the measured write operation rate based on the configurable time period.

8. The method of claim 1, wherein the memory comprises a flash memory device having a health indicator.

9. The method of claim 8, wherein each corresponding reference endurance indicator defines a number of write operations corresponding to an interval of the health indicator.

10. A computing device, comprising:
a memory storing (i) a plurality of reference write operation sizes, and (ii) for each reference write operation size, a corresponding reference endurance indicator defining a write endurance;

a processor interconnected with the memory, the processor configured to execute a monitor application simultaneously with a test application;

a profile generator configured to generate a usage profile for the test application, the usage profile for the test application generated via the monitor application and defining a measured write operation size and a measured write operation rate for write operations initiated by the test application;

an impact generator configured to determine an impact indicator for the test application based on the usage profile, the plurality of reference write operation sizes and the corresponding reference endurance indicators;

the processor further configured to present the impact indicator.

11. The computing device of claim 10, wherein the impact indicator includes a predicted lifespan of the memory.

12. The computing device of claim 10, wherein the impact generator is configured to determine the impact indicator by:

retrieving a selected reference write operation size from the plurality of reference write operation sizes that matches the measured write operation size;

retrieving a selected reference endurance indicator from the corresponding reference endurance indicators that corresponds to the selected reference write operation size; and determining the impact indicator according to the measured write operation rate and the selected reference endurance indicator.

13. The computing device of claim 12, wherein the processor is further configured to:

determine, based on the measured write operation size and the measured write operation rate, a proposed usage profile for the test application defining (i) a proposed write operation size greater than the measured write operation size, and (ii) a proposed write operation rate smaller than the measured write operation rate; and present the proposed usage profile.

14. The computing device of claim 10, wherein the processor is further configured to execute the monitor application simultaneously with the test application and a further test application;

wherein the profile generator is further configured to generate a further usage profile for the test application and the further test application; and wherein the impact generator is further configured to determine a further impact indicator for the further test application.

15. The computing device of claim 10, wherein the processor is further configured to execute the monitor application simultaneously with the test application and a further test application;

the profile generator is further configured to generate the usage profile defining a second measured write operation size and a second measured write operation rate for write operations initiated by the test application and the further test application.

16. The computing device of claim 10, wherein the processor is further configured to execute the monitor application and the test application for a configurable time period; and wherein the profile generator is further configured to determine the measured write operation rate based on the configurable time period.

17. The computing device of claim 10, wherein the memory comprises a flash memory device having a health indicator.

18. The computing device of claim 17, wherein each corresponding reference endurance indicator defines a number of write operations corresponding to an interval of the health indicator.

* * * * *